(12) United States Patent
Chan et al.

(10) Patent No.: US 6,357,768 B1
(45) Date of Patent: Mar. 19, 2002

(54) STRAIGHT LINE LINKAGE MECHANISM

(75) Inventors: Stephen K. Chan, Farmington Hills; David S. Cameron, Grosse Pointe Woods, both of MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/665,557

(22) Filed: Sep. 19, 2000

(51) Int. Cl.⁷ ............................................. B60G 21/05
(52) U.S. Cl. .............................................. 280/124.106
(58) Field of Search ..................... 280/124.1, 124.106, 280/124.11, 124.111, 124.116, 124.107, 124.128, 124.13

(56) References Cited

U.S. PATENT DOCUMENTS

| | | | | |
|---|---|---|---|---|
| 2,669,315 A | * | 2/1954 | Butterfield | 180/345 |
| 3,220,502 A | * | 11/1965 | Muller | 180/358 |
| 4,545,266 A | | 10/1985 | Brems | 74/103 |
| 5,439,091 A | | 8/1995 | Mason | 198/346.2 |
| 5,445,404 A | * | 8/1995 | Shida et al. | 280/689 |
| 5,884,925 A | | 3/1999 | Wong | 280/124.106 |
| 6,179,328 B1 | * | 1/2001 | Kawagoe et al. | 280/788 |

* cited by examiner

Primary Examiner—Paul N. Dickson
Assistant Examiner—Faye M. Fleming
(74) Attorney, Agent, or Firm—Laura C. Hargitt; Jeffrey A. Sedlar

(57) ABSTRACT

A straight line linkage mechanism for a solid axle of a motor vehicle (referable to alternatively as a "Chan-Cameron mechanism" or as a "Chan-Cameron linkage mechanism") includes a main bar, a tie rod and a shackle. The shackle is preferably configured as an "A-arm", having its legs pivotally connected to a solid axle. The apex of the shackle is pivotally connected to a first end of the main bar. The opposite second end of the main bar is pivotally connected to the frame. The tie rod is pivotally connected at one end to a mid-range location of the axle and, at its opposite end, pivotally to a mid-point location of the main bar. The connection locations of the main bar are spaced apart twice as far as the connection locations of the tie rod. In operation, as the axle moves vertically relative to the frame in response to the wheels encountering irregular terrain, the first end of the main bar will tend to move horizontally. The shackle is mounted to the axle so that the apex thereof is horizontally movable. Accordingly, the axle is able to move vertically relative to the frame without a vertical arc component.

4 Claims, 4 Drawing Sheets

STRAIGHT LINE LINKAGE MECHANISM

TECHNICAL FIELD

The present invention relates to solid axle suspensions for motor vehicles, more particularly to a straight line linkage mechanism guidably positioned between the frame and a solid axle of a motor vehicle.

BACKGROUND OF THE INVENTION

The rear axles of vehicles can generally be classified as independent, twist or solid. With a solid axle the two rear-wheels of a vehicle are connected together with some form of a rigid beam, bar or tube so that when one of the wheels encounters an irregularity in the road surface the other wheel is also affected. Most commonly, a solid axle is used at the rear of a rear-wheel drive or four wheel drive motor vehicle, particularly light trucks, the solid axle being "live axle", in the sense that the attached left and right wheels are driven through the axle via a connected drive shaft from the vehicle's engine.

As exemplified at FIG. 1, a solid axle 10 is mounted to a suspension system which allows the axle to travel vertically as the wheels track over rises and dips on a road (or off-road) surface. In order for the axle to accommodate vertical travel relative to the frame 12 (shown cut-away for clarity), the axle is biasably mounted relative to the frame, as for example including a pair of leaf or coil springs 14 and a pair of shock absorbers 16. In order to provide proper tracking of the axle as it undergoes vertical movement relative to the frame, it is known in the art to employ a track bar linkage 18. A track bar is a rigid metal beam having a pivotal frame attachment 20 at one end, and a pivotal axle attachment 22 at the other end. For a further detailed description of a suspension system associated with a track bar linkage, see U.S. Pat. No. 5,884,925 to Wong.

A deficiency of the track bar is that as the axle moves vertically, the track bar requires that the axle attachment arc pivotally in relation to the frame attachment. One known solution is to replace a track bar linkage with a "Scott-Russell" linkage mechanism. FIG. 2 shows such a Scott-Russell linkage mechanism 50 associated with a suspension system which is structurally and functionally substantially the same as that described above. The Scott-Russell linkage mechanism 50 includes a rigid beam 52, a connector rod 54 and a link 56. The link 56 is pivotally connected to the axle 58 and to a first end 60 of the beam. A second end 62 of the beam is pivotally connected to the frame 64 (shown cut-away for clarity). The connector rod 54 is pivotally connected between a mid-point location of the beam and a mid-region location of the axle.

FIG. 3 diagrammatically depicts the above described Scott-Russell linkage mechanism 50. The theory of ideal operation of the Scott-Russell linkage mechanism is as follows: since the connector rod 54 is half as long as the beam 52 and since the connector rod is connected to the mid-point of the beam, as the axle 58 moves vertically relative to the frame 64, the first end 60 of the beam 52 would move horizontally, allowing for vertical movement of the axle. However, in practice, the first end 62 is not able to move truly horizontally because of the associated pivoting of the link 56. Accordingly, a Scott-Russell linkage mechanism has a deficiency in that the link 56 forces the first end 60 of the beam to move in a vertical arc 64 rather than truly horizontally.

What remains needed in the art is a linkage which overcomes the aforesaid deficiency of a Scott-Russell linkage mechanism.

SUMMARY OF THE INVENTION

The present invention is a solid axle guidance linkage mechanism having a straight line movement which does not suffer from the movement deficiencies associated with either a track bar linkage or a Scott-Russell linkage mechanism.

The straight line linkage mechanism according to the present invention, (which may be referred to alternatively as either a "Chan-Cameron mechanism" or a "Chan-Cameron linkage mechanism") includes a main bar, a tie rod and a shackle. The shackle is preferably configured as an "A-arm", having its legs pivotally connected to a solid axle. The apex of the shackle is pivotally connected to a first end of the main bar. The opposite second end of the main bar is pivotally connected to the frame. The tie rod is pivotally connected at one end to a mid-range location of the axle and, at its opposite end, pivotally to a mid-point location of the main bar. The connection locations of the main bar are spaced apart twice as far as the connection locations of the tie rod.

In operation, as the axle moves vertically relative to the frame in response to the wheels encountering irregular terrain, the first end of the main bar will tend to move horizontally. The shackle is mounted to the axle so that the apex thereof is horizontally movable. Accordingly, the axle is able to move vertically relative to the frame without a vertical arc component.

Accordingly, it is an object of the present invention to provide a straight line linkage mechanism for a solid axle.

This and additional objects, advantages, features and benefits of the present invention will become apparent from the following specification.

DESCRIPTION OF THE PREFERRED EMBODIMENT

Referring now to FIGS. 4 through 8, a straight-link linkage system 100 according to the present invention will be described.

Figure 4:
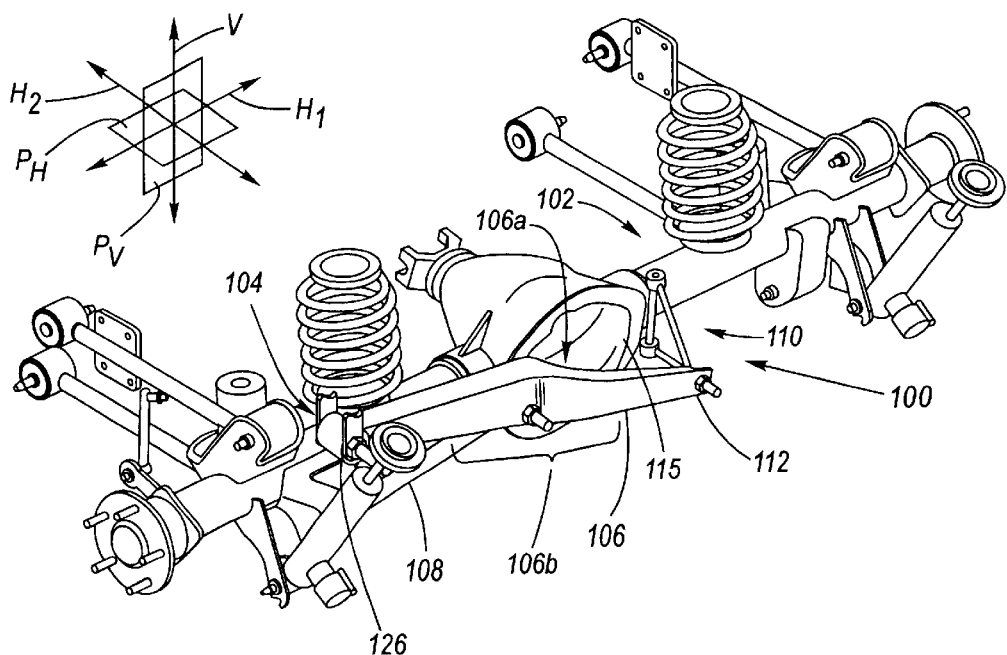
FIG. 4 is a perspective view of a straight line linkage mechanism according to the present invention, shown in operation with a solid axle suspension system.

FIG. 4 shows a solid axle 102 is able to move vertically relative to a frame 104 (shown fragmentally for clarity) in a vertical plane $P_V$ defined by vertical axis V (which is perpendicular to the axle axis) and a first horizontal axis $H_1$ (which is parallel to the axle axis). The solid axle 102 is connected with a generally conventional suspension system and is guided by the straight line linkage mechanism 100 of the present invention. The straight line linkage mechanism 100 includes of a main bar 106, a tie rod 108 and a shackle 110.

The main bar 106 is a rigid, elongated member which may include contouring 106a to accommodate clearance of nearby components, such as for example a gear case 115 of the solid axle 102, and preferably is more massive at its mid-range 106b for increased robustness in relation to over-all weight. A first end 112 of the main bar 106 is pivotally connected to the shackle 110. In this regard, it is preferred for this pivotal connection to be in the form of a ball-and-socket joint 114, most preferably having the ball component thereof associated with the shackle and the socket component thereof being associated with the main bar, although the reverse may be utilized.

Figure 5:
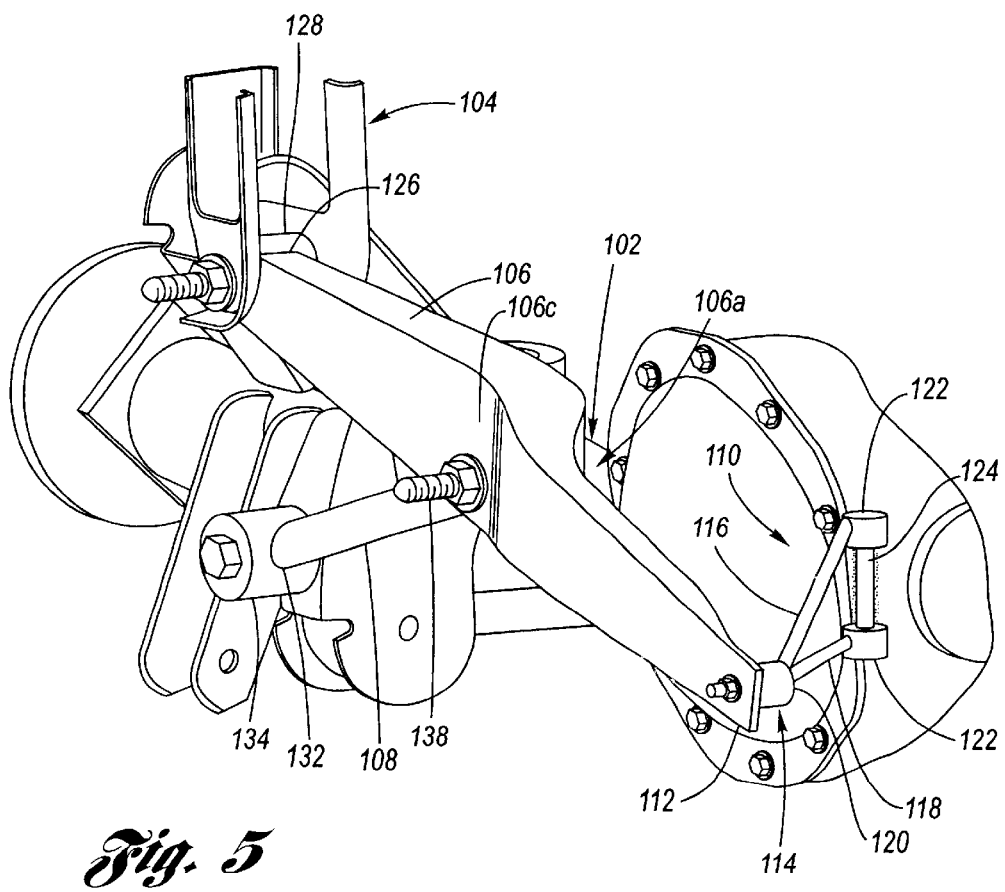
FIG. 5 is a perspective view of the straight line linkage mechanism, seen along arrow 5 of FIG. 4.
Figure 6:
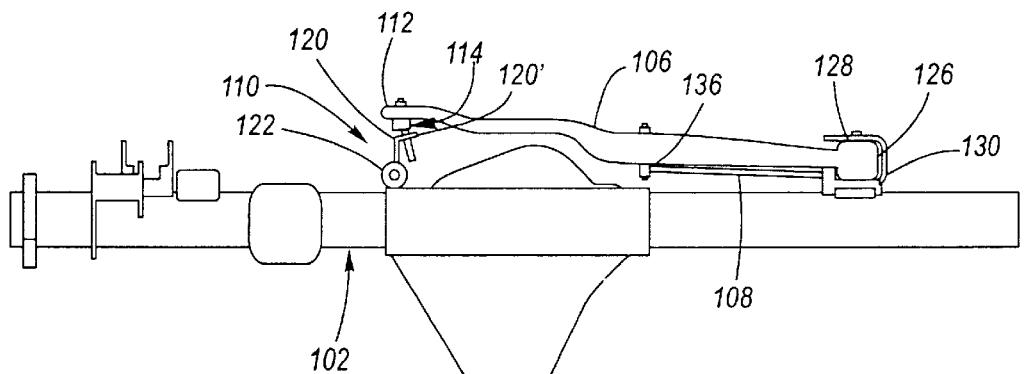
FIG. 6 is a top plan view of the straight line linkage mechanism, shown in operation with a solid axle suspension system.

The shackle 110 is rigid and is preferably configured as an "A-arm", having a first leg 116 and a second leg 118 which collectively form an apex 120, wherein the aforementioned joint 114 is connected to the apex 120 via a flange 120'. Opposite the apex 120, the first and second legs 116, 118 are pivotally connected to the solid axle 102. As best seen at FIG. 5, the pivotal connection of the first and second legs 116, 118 is provided by rubber bushings 122 interfaced with a vertical rod 124, wherein the rod is fixedly connected to the axle 102. Accordingly, the shackle 110 is able to pivot on the rod 124 such that the apex 120 moves without vertical arcing in a horizontal plane $P_H$ defined by the first horizontal axis $H_1$ and a second horizontal axis $H_2$ (which is perpendicular to the vertical and fist horizontal axes V, $H_1$). While other configurations of the shackle may be used, such as a bar pivotally connected to the rod 124, an "A-arm" configuration is preferred because of its superior robustness in relation to its weight.

The opposite second end 126 of the main bar 106 is pivotally connected to the frame 104, such as for example by a rubber insert bushing 128. The orientation of the pivotal connection is such as to allow the main bar 106 to pivot in the vertical plane $P_V$ relative to the frame.

The tie rod 108 is a rigid, elongated member which is pivotally connected at one end 132 to the axle 106 via a rubber insert bushing 134. At the opposite end 136, the tie rod 108 is pivotally mounted to a mid-point 106c of the main bar 106, such as for example by a bolt 138.

Figure 1:
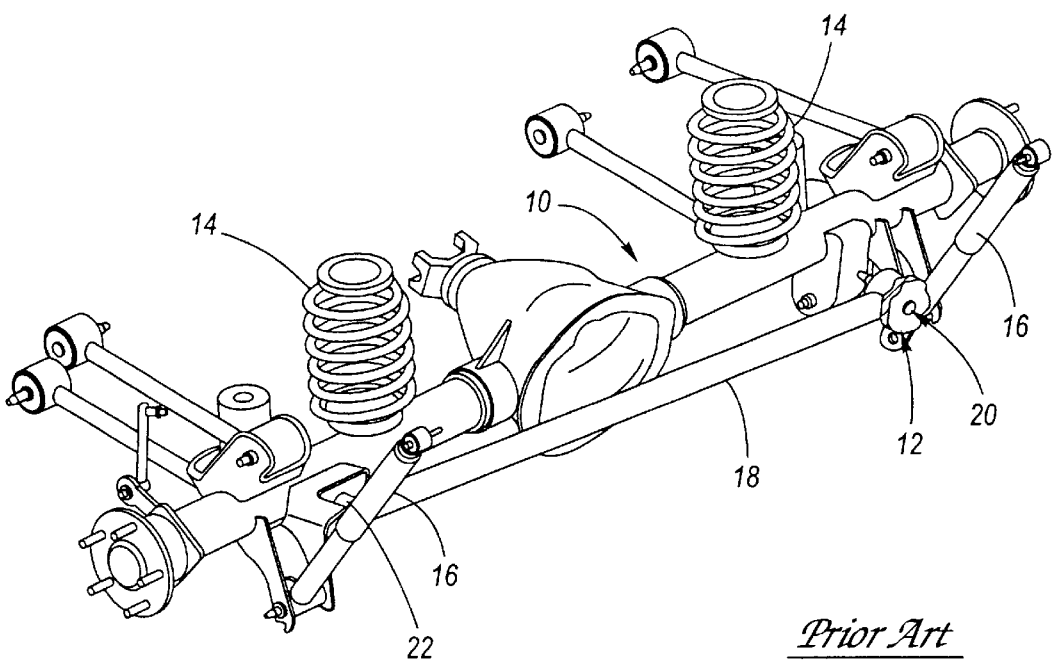
FIG. 1 is a perspective view of a prior art solid axle suspension system associated with a track bar linkage.
Figure 2:
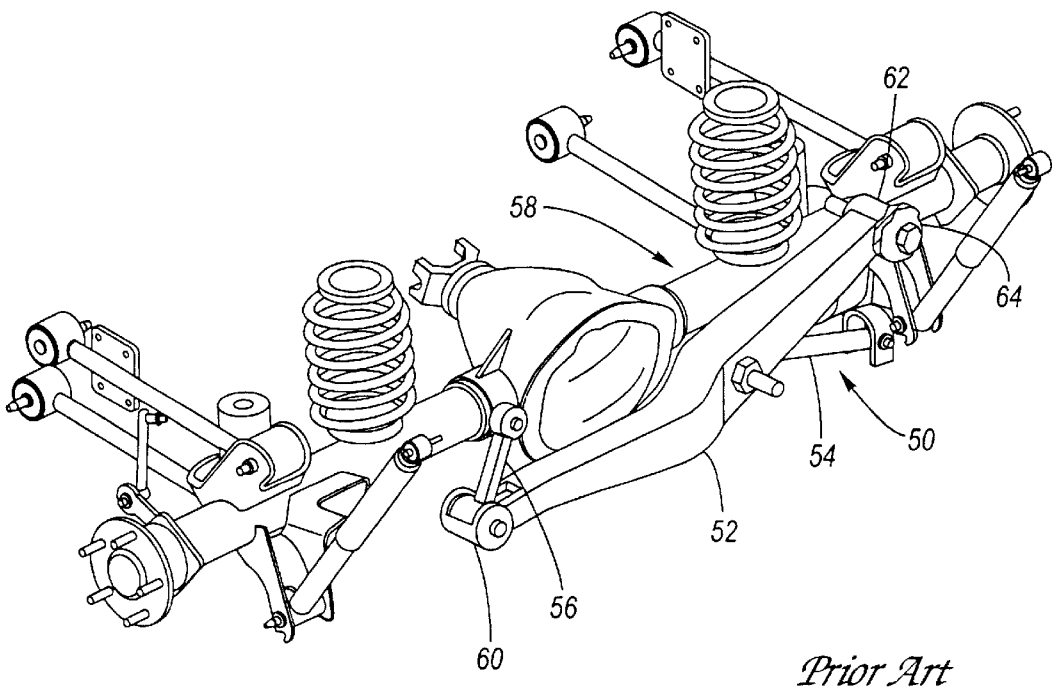
FIG. 2 is a perspective view of a prior art solid axle suspension system associated with a Scott-Russell linkage mechanism.
Figure 3:
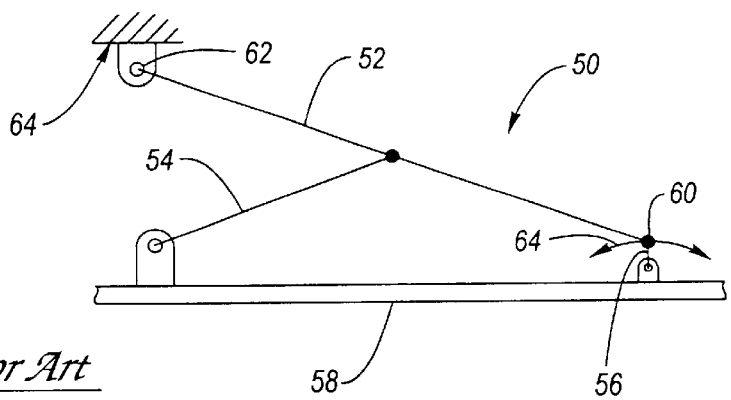
FIG. 3 is a diagram of a solid axle interfaced with a Scott-Russell linkage mechanism.
Figure 7:
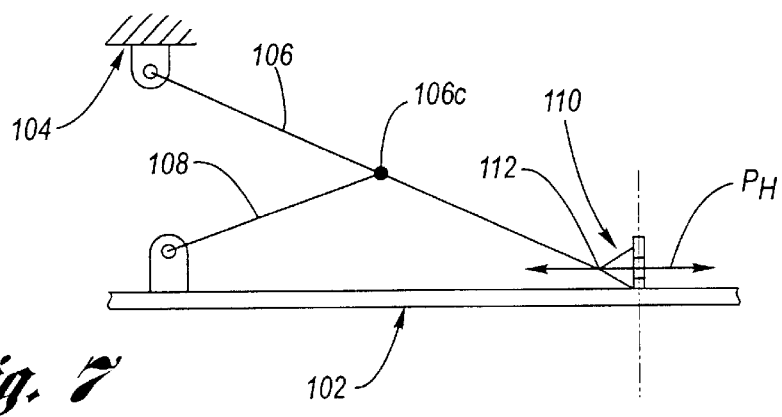
FIG. 7 is a diagram of a solid axle interfaced with the straight line linkage mechanism according to the present invention.

FIG. 7 diagrammatically depicts the above described straight line linkage mechanism 100. The theory of operation is that since the pivot connections of the tie rod 108 are spaced apart half as far as the pivot connections of the main bar 106 and since the tie rod is connected to the mid-point 106c of the main bar (that is, the mid-point is located medially between the pivot connection of the main bar), as the axle 102 moves vertically in the vertical plane $P_V$ relative to the frame 104, the first end 112 of the main bar moves horizontally in the horizontal plane $P_H$, allowing for vertical movement of the axle. In practice, this is exactly what occurs, since the shackle 110 allows the first end 112 to move along the horizontal plane $P_H$, the movement is truly horizontal and without vertical arcing.

Figure 8:
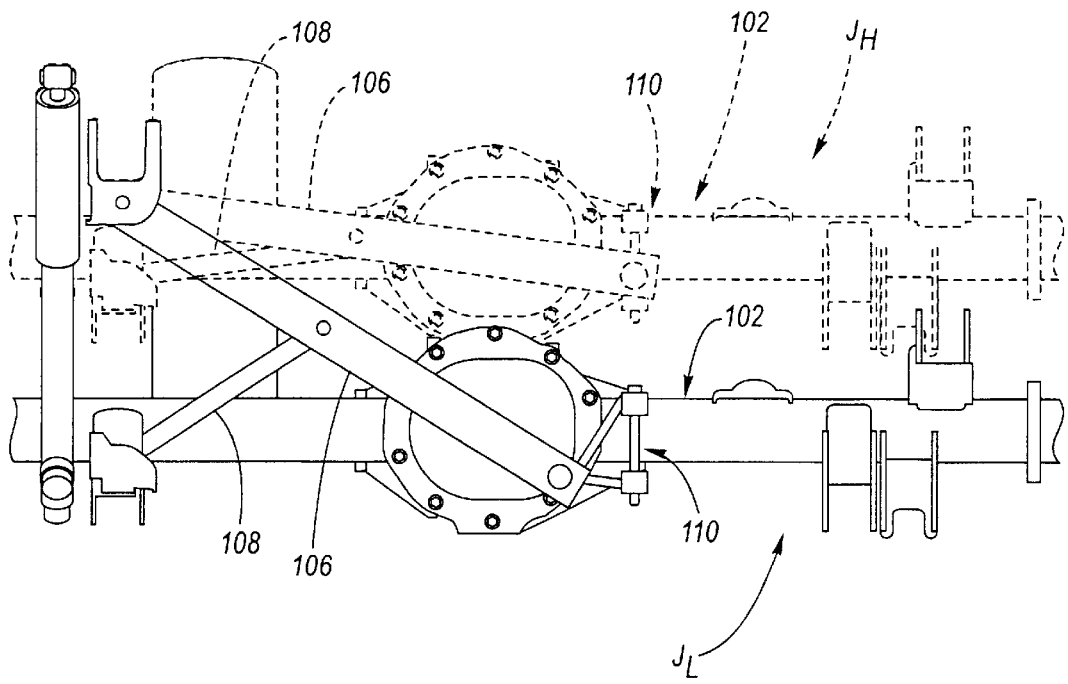
FIG. 8 is a rear view of the suspension system and straight line linkage mechanism as shown at FIG. 4, shown at highest and lowest jounce.

Referring now to FIG. 8, operation of the straight line linkage mechanism 100 will be discussed. The axle 102 is shown at highest jounce $J_H$ and lowest Jounce $J_L$ relative to the frame 104. The axle is able to move conformably in response to changes in terrain elevation, without a component of vertical arc being introduced, as the shackle 110 pivots horizontally (to the left of FIG. 8).

Figure 9:
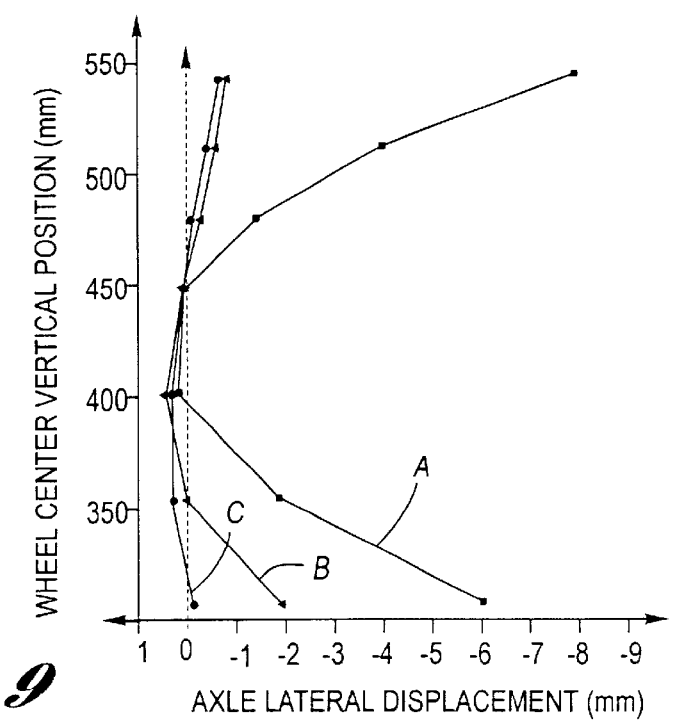
FIG. 9 is a graphical comparison between suspension systems equipped with a track bar, Scott-Russell linkage mechanism and a straight line linkage mechanism according to the present invention.

Shown at FIG. 9 is are plots of axle lateral displacement vs. wheel center vertical position for a solid axle mounted with a track bar linkage, plot A, a solid axle mounted with a Scott-Russell linkage mechanism, plot B, and a solid axle mounted with a Straight line linkage mechanism 100, plot C. Notice that plot C clearly has the least axle lateral displacement.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. A straight line linkage mechanism for a motor vehicle having a frame and a solid axle, comprising:

a main bar having a first bar location, a second bar location, and a third bar location located between said first and second bar locations, said first and second bar locations being separated a first predetermined distance;

a shackle pivotally connected to said first bar location wherein said shackle comprises a first leg and a second leg, said first and second legs forming an A-arm configuration having an apex, wherein said first shackle location is located at said apex and wherein said second location is located at each of said first and second legs opposite said apex;

a tie rod having a first rod location and a second rod location, said first and second rod locations being separated a second predetermined distance, said first rod location being pivotally connected to said third bar location and wherein said first predetermined length is substantially twice said second predetermined length and said third bar location is located substantially medially between said first and second bar locations;

a shackle connection pivotally connecting said shackle to a solid axle of a motor vehicle;

a rod connection pivotally connecting said second rod location to the solid axle of the motor vehicle; and a bar connection pivotally connecting said second bar location pivotally to a frame of the motor vehicle;

wherein movement of the solid axle in a vertical plane relative to the frame results in said first bar location moving in a horizontal axis that is perpendicular to the vertical axis;

and wherein said shackle has a first shackle location and a second shackle location, said first and second shackle locations being mutually spaced apart, said first shackle location being pivotally connected to said first bar location, said second shackle location being pivotally connected to the solid axle.

2. The straight line linkage mechanism of claim 1, wherein said pivotal connection between said first shackle location and said first bar location comprises a ball-and-socket connection.

3. A motor vehicle equipped with a straight line linkage mechanism, comprising:

a frame;

a solid axle movable to said frame in at least a vertical plane;

a main bar having a first bar location, a second bar location, and a third bar location located between said first and second bar locations, said first and second bar locations being separated a first predetermined distance;

a shackle pivotally connected to said first bar location wherein said shackle comprises a first leg and a second leg, said first and second legs forming an A-arm configuration having an apex, wherein said first shackle location is located at said apex and wherein said second location is located at each of said first and second legs opposite said apex;

a tie rod having a first rod location and a second rod location, said first and second rod locations being separated a second predetermined distance, said first rod location being pivotally connected to said third bar location and wherein said first predetermined length is substantially twice said second predetermined length and said third bar location is located substantially medially between said first and second bar locations;

a shackle connection pivotally connecting said shackle to a solid axle of a motor vehicle;

a rod connection pivotally connecting said second rod location to the solid axle of the motor vehicle; and a bar connection pivotally connecting said second bar location pivotally to a frame of the motor vehicle;

wherein movement of the solid axle in a vertical plane relative to the frame results in said first bar location moving in a horizontal axis that is perpendicular to the vertical axis;

and wherein said shackle has a first shackle location and a second shackle location, said first and second shackle locations being mutually spaced apart, said first shackle location being pivotally connected to said first bar location, said second shackle location being pivotally connected to the solid axle.

4. The motor vehicle of claim 3, wherein said pivotal connection between said first shackle location and said first bar location comprises a ball-and-socket connection.

\* \* \* \* \*